United States Patent [19]

Kawakubo

[11] 4,412,675
[45] Nov. 1, 1983

[54] CARBON SPRING AND PROCESS FOR PREPARING THE SAME

[75] Inventor: Takamasa Kawakubo, Shinmachi, Japan

[73] Assignee: Mitsubishi Pencil Co., Ltd., Tokyo, Japan

[21] Appl. No.: 286,772

[22] Filed: Jul. 27, 1981

[30] Foreign Application Priority Data

May 11, 1981 [JP] Japan .................................. 56-069293

[51] Int. Cl.$^3$ ............................................. C01B 31/02
[52] U.S. Cl. ..................................... 267/167; 423/449
[58] Field of Search ................. 252/29, 502; 264/29.1; 267/61, 148, 166, 167, 140.4, 141; 423/445, 447.1, 449; 528/481

[56] References Cited

U.S. PATENT DOCUMENTS

| | | | |
|---|---|---|---|
| 3,423,496 | 1/1969 | Olstowski | 252/29 |
| 3,956,436 | 5/1976 | Honda et al. | 252/29 X |
| 4,080,417 | 3/1978 | Kishimoto et al. | 423/447.1 X |
| 4,293,533 | 10/1981 | Asano et al. | 423/449 |

*Primary Examiner*—Duane A. Reger
*Attorney, Agent, or Firm*—Oblon, Fisher, Spivak, McClelland & Maier

[57] ABSTRACT

A carbon spring composed substantially of carbonaceous carbon or graphite carbon is prepared by shaping an organic linear material to a coiled spring and thereafter heating it to carbonize.

13 Claims, No Drawings

CARBON SPRING AND PROCESS FOR PREPARING THE SAME

BACKGROUND OF THE INVENTION

The present invention relates to a carbon spring and a process for preparing the same. More particularly, the present invention relates to a carbon spring comprising having carbonized an organic linear material after shaping it to a coiled spring and a process for preparing the carbon spring.

Herein the term of "carbon" includes carbonaceous (amorphous) carbon and graphite (crystalline) carbon and, therefore, the carbon spring means both a carbonaceous spring comprising substantially carbonaceous carbon and having a specific property of carbonaceous carbon and a graphite spring comprising substantially graphite carbon and having a specific property of graphite carbon.

A carbon material is so excellent in heat resistance that it is neither molten nor deformed in a non-oxidizing atmosphere. And it is a good conductive material of electricity and heat nearly like a metal and has an excellent lubrication characteristic.

As a general rule, a carbon material has a good resistance to corrosion so that it is not affected with various chemicals, and is possible to display high hardness and strength inspite of light weight. Thus, a carbon material is so useful that it possesses characteristics as could not be obtained even in metal and ceramics.

Many various kinds of carbon are used practically, however recently the development of flexible carbon has been noted and the physical and chemical properties of carbon have started to be utilized on a full scale.

Particularly, the development of high strength carbon spring utilizing the exhibition of high mechanical strength and the maintainance of coefficient of elasticity under very high temperatures, heat distortion resistance and stability for corrosive atmosphere is useful for equipments for chemical synthesis, members for analytical instrument and members for engine.

However, a carbon material is deficient in malleability and ductility and is very difficult to be precisely processed to any desired shape as a metallic or plastic material. Therefore, a complicated and difficult work such as quarrying out from a large block of molded carbon and cutting and processing by a NC lathe has hitherto been unavoidably needed, particularly such a product as a spring which is finely linear and is extremely required an orientation is most difficult to be manufactured and has not yet been produced.

SUMMARY OF THE INVENTION

An object of the present invention is to provide a finely linear carbon article such as a spring the manufacture of which has hitherto been actually impossible, particularly a carbon coiled spring, and a process for preparing the same.

The present inventor, as the result of studying with utmost effort for the purpose of preparing a carbonaceous or graphite carbon spring which is excellent in heat resistance and corrosion resistance, light in weight and high in strength, precisely in any dimension and shape and cheaply, has thought that a carbonaceous or graphite carbon spring may be obtained by shaping an organic linear material or an organic linear material composite-reinforced with a carbon fiber, graphite whisker or crystalline graphite powder to any form of coiled spring and thereafter heat treating it in an inert atmosphere, and has accomplished the object of the present invention.

The present invention or graphite carbon spring so obtained is very high in procession accuracy so that any after-procession is not necessary, excellent in heat resistance and corrosion resistance, and high in strength, and possesses a reliable and accurate elasticity modulus.

DETAILED DESCRIPTION OF THE PREFERRED EMBODIMENTS

The organic linear material used in the present invention comprises a linear material formed from one selected from organic high molecular weight substances, asphalt pitches and carbonized pitches or a mixture of two or more of them, and the composite-reinforced organic linear material comprises a linear material formed by highly orientating one selected from organic high molecular weight substances, asphalt pitches and carbonized pitches or a mixture of two or more of them, which is uniformly dispersed with a carbon fiber, graphite whisker or crystalline graphite powder.

In general, a linear material is one which is 0.1 mm to a few mm in diameter, and one below a few mm in diameter is referred to as a fiber material and one above a few mm in diameter is referred to as a rod material. However in the present invention these are not strictly distinguished by diameters.

The organic high molecular weight substance used in the present invention includes a natural high molecular weight substance, a synthetic high molecular weight substance, a thermoplastic resin, a thermosetting resin, and the like. Examples will be given as under.

As a natural organic high molecular weight substance, a compound having a condensed polycyclic aromatic in the basic structure of molecule, such as lignin, cellulose, tragacanth gum, gum arabi, natural rubber, humic acid and its derivatives, saccharides, chitin, chitosan, etc. and comparatively high in carbon yield is preferable. Some of them are deficient in shaping with alone and difficult in ideal carbonization, however, these substances are possible to form a carbon precursor easily by incorporating a carbonization promoting catalyst (for example an oxide of Fe, Co, Ni and a Lewis acid of $AlCl_3$ etc.) or other compounds therein and heating it to perform a dehydrogenation treatment, and cocarbonize therewith.

A synthetic high molecular weight substance referred herein is a compound having a condensed polycyclic aromatic in the basic structure of molecule which is high in carbon yield, other than thermoplastic resins and thermosetting resins described later, such as, for example formalin condensate of naphthalene sulfonic acid (surfactant intermediate), dinitronaphthalene, indanthrene vat dyes derived from pyrene, pyranthrone, violanthrone, benzanthrone such as CI Vat Yellow 4, CI Vat Orange 2, CI Vat Orange 9, CI Vat Violet 1, CI Vat Blue 18, CI Vat Blue 20, CI Vat Green 1, etc. and intermediates thereof, which provides an effective carbon material by heat treatment, but some of them are deficient in shaping property with alone and so are difficult to be processed to any desired form of product.

These materials deficient in shaping property can be more effectively cocarbonized by easily forming a carbon precursor by making composite with the later described thermoplastic resin having a free processability by using any suitable carbonization promoting catalyst and, after shaping to any desired form, heat treating.

A thermoplastic resin includes an ordinary thermoplastic resin such as polyvinyl chloride, polyacrylonitrile, polyvinylidene chloride, polyvinyl acetate, polyvinyl alcohol, polyvinyl pyrrolidone, ethyl cellulose, polyvinyl chloridevinyl acetate copolymer, polyacrylonitrile-styrene copolymer, polyacrylonitrile-vinyl chloride copolymer, polyamide, carboxymethylcellulose, etc. and a heat resistant thermoplastic resin such as polyphenylene oxide, polyparaxylene, polysulfone, polyimide, polyamide-imide, polyester imide, polybenzimidazole, polyoxadiazole, etc.

These thermoplastic resins can be used alone or as a reinforced composite matrix, and also are possible to be used as a forming binder to be made composite to a material deficient in shaping property with alone of the above described natural or synthetic high molecular weight substances.

As a thermosetting resin, phenol resin, epoxy resin, xylene resin, alkyd resin, unsaturated polyester resin, etc. are used, which flow by heating and simultaneously come about an intermolecular crosslink to form a three-dimensional structure thereby becoming insoluble and infusible and showing a high carbon yield without performing any special treatment for forming a carbon precursor.

As pitches, petroleum asphalt, coal tar pitch, cracked naphtha pitch and carbonized materials of hydrocarbon compound of petroleum asphalt, coal tar pitch, synthetic resin, etc. (treated at below 400° C.) are used.

The organic linear material in the present invention is prepared by directly melting one or more of the above described natural high molecular weight substances, synthetic high molecular weight substances, thermoplastic resins, thermosetting resins and pitches, or, after adding and dispersing a solvent well and a plasticizer as the need arises, pelletizing them and extruding to the desired diameter by means of a plunger extruder, screw extruder, etc.

At the time of mixing two or more kinds of material, such a method as dispersing the materials by a high-speed blender such as Henschel mixer, etc., when using a plasticizer it is absorbed into the resin well in this step, and subsequently blending them by using a kneader such as press kneader, a twin roll, etc. by which a high shearing force can be provided is suitable. In the extrusion the linear material is preferably subjected to an appropriate orientating operation for the purpose of improving the solid state properties thereof.

In order to obtain an organic linear material composite-reinforced with a carbon fiber, graphite whisker, crystalline graphite powder, etc., one or more of the above mentioned natural high molecular weight substances, synthetic high molecular weight substances, thermoplastic resins, thermosetting resins and pitches are used as a chief material and are blended with a carbon fiber, graphite whisker, crystalline graphite powder, etc. selected suitably according to the object, after sufficient powder dispersion by Henschel mixter, a plasticizer, solvent, etc. are added thereto if necessary, and the resulting blend is sufficiently kneaded and dispersed using a kneader such as a press kneader, a twin roll, etc. by which a high shearing force can be provided. And thereafter the blend is pelletized by a pelletizer and extruded to the desired diameter of linear material by means of a plunger extruder, screw extruder, etc.

At this time an orientating operation is desirable for the purpose of improving the solid state properties.

The organic linear material and composite-reinforced organic linear material obtained by such means have sufficient flexibility and high tensile strength and have processability satisfactory for shaping step of making a coiled spring, which is the second step.

In case of shaping to a coiled spring in the second step, the organic linear materials or composite-reinforced organic linear materials are coiled on a desired diameter and dimension of round rod or pipe having a smooth surface made of a heat resistance material (bearing up against a high temperature of above 1000° C.) as a supporting base and fixed at the both ends.

In order to carbonize and graphitize the linear materials while maintaining the shape, in case of being composed of thermosetting resin, the materials can be carbonized directly by raising the temperature as it is since it is cross-linked three-dimensionally by heating to be insolubilized and infusibilized, but in the materials having thermoplasticity it is required to perform an insolubilizing and infusibilizing treatment to convert them to a carbon precursor since they tend to deform at an elevated temperature though different in melting point or sortening point.

The insolubilization and infusibilization can be performed by a method of blending a carbonization promoting catalyst (an oxide of Fe, Co, Ni, Lewis acid, etc.), a method of adding a crosslinking agent such as sulfur, peroxides, etc., a method of dehydration treatment by immersing into phosphoric acid, sulfuric acid, etc., or a method of oxidation crosslinking by heating at 50° to 300° C. in an atmosphere of chlorine, ozone, or hot air, etc.

And in case of a material having lower melting and such a material as depolymerizing in heating step to become a lower molecular weight material, a chemical treatment as adding previously an oxidizing agent as a cross-linking agent or a condensation polymerization initiator, etc., or adding a carbonization promotor to modify is effective for the purpose of making it heat resistant, and simultaneously the purpose is accomplished by performing a physical treatment of crosslinking curing by irradiating ultraviolet, electron beam, radiation, etc. from the outside of shaped material.

The coiled spring having performed a carbon precursor treatment by any of the above described means, if it is a carbonaceous spring, may be gradually heated to 500° to 1500° C., preferably above 1000° C., in an inert gaseous phase such as nitrogen, argon, etc., in a state as it is wound on the heat resistant round rod or pipe as a supporting base for the purpose of preventing the deformation and increasing the tensile strength.

Further, in order to obtain a graphite spring, it is accomplished by heating the material to 2000° to 3000° C., preferably above 2500° C. in an inert gaseous phase.

A carbon filter, graphite whisker and crystalline graphite powder used as a composite-reinforcing material in the present invention will be further explained.

The content of composite-reinforcing agent in the composite-reinforced organic linear material varies with the kinds of matrix material used and the diameter of organic linear material although it is needed to be 20 to 80%, by weight, preferably 40 to 70%, by weight, in the organic liner material composition.

If the content is less than 20%, by weight, the action and effect of composite-reinforcement is deficient, but more than 80%, by weight, is not preferable since in more than 80%, by weight, the fabrication quality such as unstable extrusion at the time of extrusion and chalk mark on the surface of product is deteriorated and simultaneously sufficient deaerating operation becomes difficult thereby the inclusion of air bubble occurs and sufficient flexibility is lost at the time of shaping to a coiled spring.

A carbon fiber used in the present invention may be a carbonaceous fiber calcined at 1000° C. or a graphite fiber calcined at 2000° C. according to the object, and may be preferably adjusted to be approximate $10 \pm 2$ $\mu$m in fiber diameter (D) and more than 20, preferably more than 50 in aspect ratio (L/D), wherein L is fiber length. In case L/D is less than 20 the reinforcing action is too lowered to meet the desire.

Graphite whisker is single-crystalline carbon produced by reacting a gas of hydrocarbon, etc. as a raw material and an inert gas as a carrier gas at 1000° to 1400° C. in a reaction tube. Graphite whisker has an excellent property as a composite-reinforcing material as 500 kg/mm$^2$ in tensile strength and 37.5 t/mm$^2$ in Young's modulus. Also in this case L/D of more than 20 is desirable for the same reason as in carbon fiber.

The carbon fiber and graphite whisker exhibit a reinforcing action in the linear direction while the crystalline graphite powder can reveal a reinforcing action in the secondary (plan) direction based on highly-developed scaly crystals. The graphite powder is used properly within the range of 0.5 to 150 $\mu$m in average particle size according to the diameter of linear material intended to be used. If finer than 0.5 $\mu$m it is wanting in reinforcing action and the dearation becomes difficult and if more than 150 $\mu$m it is difficult to be united as a composite form so that the surface of product is rough and the solid state properties deteriorate.

The ratio of length and breadth of crystal piece is at least 2 and preferably as thin as possible. In case the piece is below 2 in the ratio or thicker, the reinforcing effect is small so that such a trouble that the extrusion workability gets worse and it is difficult to shape to a coiled spring comes about.

EXAMPLE 1

100%, by weight, of straight vinyl chloride resin of 700 in average degree of polymerization and 20%, by weight, of D.O.P. were homogeneously dispersed in a Henschel mixer. When the plasticizer soaked sufficiently through the resin, the resulting dispersion was sufficiently kneaded in a pressure kneader while maintaining the jacket temperature at 120° C. and the material temperature at 150° C., and subsequently was pelletized by a pelletizer.

The resulting pellet composition was extruded through a die of 0.75 mm in diameter by a single screw extruder to obtain a vinyl chloride linear material which was then wound on a carbonaceous bobbin (of 10.0 mm in diameter) having a smooth surface and was maintained at 100° C. for 10 hours and further at 180° C. for 24 hours in the presence of air in an oven, thereafter was raised the temperature to 500° C. at a heating rate of 10° C. per hour in an atmosphere of nitrogen subsequently raised to 1000° C. at 50° C. per hour and then, after maintained at that temperature for 3 hours, was allowed to cool spontaneously to ordinary temperatures.

The resulting shape was released from the bobbin to obtain a carbonaceous coiled spring of 0.4 mm in line diameter, 10 mm in coil diameter and 100 mm in spring length. The carbonization yield (weight percentage of carbonaceous spring to organic linear material used) was 45%.

EXAMPLE 2

100%, by weight, of chlorinated vinyl chloride resin of 800 in average degree of polymerization and 64.6% in chlorine content and 20 parts, by weight, of D.O.P. were homogeneously dispersed in a Henschel mixer. When the plasticizer soaked sufficiently through the resin, it was sufficiently kneaded in a pressure kneader while maintaining the jacket temperature at 140° C. and the material temperature at 160° C., and subsequently was pelletized by a pelletizer to obtain a a pellet composition. The resulting composition was extruded through a die of 0.75 mm in diameter by a single screw extruder to obtain a chlorinated vinyl chloride linear material. And then in the same manner as in Example a carbonaceous coiled spring was obtained.

The resulting carbonaceous spring was 0.45 mm in line diameter, 10 mm in coil diameter and 100 mm in spring length. The carbonization yield was 48%.

EXAMPLE 3

100%, by weight, of uncured novolak of 125° C. in softening temperature were added with 20%, by weight, of methanol and were well dispersed in a Henschel mixer thereafter were deaerated and preformed by a pressure vacuum forming machine. The resulting preform was filled up into a plunger type hydraulic extrusion press and was melt extruded through a die of 1.0 mm in diameter at 140° C. to obtain a novolak resin linear material. The linear material was coiled on a carbonaceous round rod of 20 mm in diameter and was fixed the both ends. Thereafter it was immersed into a curing bath comprising a mixed aqueous solution of 18%, by weight, of hydrochloric acid and 15%, by weight, of formaldehyde and was gradually raised the temperature from room temperature to 100° C. over 2 hours and maintained at 100° C. for 2 hours to cure to obtain an insoluble and infusible novolak resin shape.

The shape was treated to 500° C. at a heating rate of 50° C. per hour in an atmosphere of nitrogen subsequently to 1000° C. at 100° C. per hour and, after maintained at 1000° C. for 3 hours, was allowed to cool, and then was released from the round rod to obtain a carbonaceous coiled spring. The spring was 0.7 mm in line diameter, 20 mm in coil diameter and 150 mm in spring length. The carbonization yield was 75%.

EXAMPLE 4

100%, by weight, of furan resin (precondensate of furfuryl alcohol) and 100%, by weight, of straight vinyl chloride resin of 700 in average degree of polymerization were added with 50%, by weight, of crystalline graphite powder of 2.0 $\mu$m in average particle size and 10%, by weight, of D.O.P. as a plasticizer, and, after dispersed in a Henschel mixer, were kneaded in a pressure kneader maintained below 120° C. for 30 minutes to obtain a homogeneous composition.

The preformed composition sufficiently deaerated in a vacuum preforming machine was filled up into a plunger type hydraulic extruder and extruded through a die of 0.7 mm in diameter to obtain a linear material. Subsequently, the linear material was coiled on a round carbon rod of 5 mm in diameter and was fixed the both ends. The coiled shape was maintained in an oven heated at 180° C. in the presence of air for 20 hours so that the furan resin was sufficiently cured by hydrochloric acid gas generated by the decomposition of vinyl chloride resin by heating to obtain an insoluble and infusible precursor shape.

The shape so obtained was raised the temperature to 300° C. at a heating rate of 10° C. per hour in an atmosphere of nitrogen and raised to 500° C. at 20° C. per hour and further raised to 1000° C. at 50° C. per hour and, after maintained at 1000° C. for 3 hours, was allowed to cool to obtain the desired carbonaceous spring.

The carbonaceous spring obtained was 0.55 mm in line diameter, 5 mm in coil diameter and 150 mm in spring length, and 98.5% in carbon content. And the linear material was 6000 kg/cm$^2$ in bending strength.

EXAMPLE 5

100%, by weight, of C.I. Vat Black 9 (Mikethren Direct Black RB, an intermediate manufactured by Mitsui Chemical's Inc.) were added with 40%, by weight, of vinyl chloride-vinyl acetate copolymer resin (average degree of polymerization 1000) composed of 85% of vinyl chloride and 15% of vinyl acetate and 20%, by weight, of D.O.P., and, after dispersed by a Henschel mixer, were kneaded in a pressure kneader maintained the bath temperature at 120° C. and the material temperature at 145° C. till it was completely homogenized to obtain a composition.

The composition was sufficiently deaerated in a vacuum preforming machine to obtain a preform which was then extruded through a die of 0.3 mm in diameter with a diehead temperature of 120° C. by a plunger type hydraulic extruder to obtain an organic linear material. The linear material was wound on a round carbon rod of 2.0 mm in diameter and fixed on both ends, and thereafter was heat treated at 100° C. for 10 hours and at 180° C. for 20 hours in the presence of air in an oven to make it insoluble and infusible. Subsequently it was raised the temperature to 300° C. at a heating rate of 10° C. per hour, to 500° C. at 20° C. per hour further to 1000° C. at 50° C. per hour and, after maintained at 1000° C. for 3 hours, was allowed to cool to obtained the desired carbonaceous spring.

The carbonaceous spring obtained was 0.1 mm in line diameter, 2.0 mm in coil diameter and 100 mm in spring length, and 80% in carbonization yield.

EXAMPLE 6

A straight vinyl chloride resin of 2000 in average degree of polymerization was placed into a dry distillation furnace and heated gradually to 400° C. at a heating rate of 5° C. per minute while introducing nitrogen gas thereinto and maintained at 400° C. for 60 minutes to complete the dry distillation, thereafter was cooled to obtain a dry distilled pitch of 275° C. in melting point. The pitch was finely ground to about 10 μm in average particle size in a ball mill to use.

100%, by weight, of chlorinated vinyl chloride resin of 800 in average degree of polymerization and 64.6% in chlorine content were homogeneously dispersed with 100%, by weight, of the above mentioned pitch grinds and 25%, by weight, of D.O.P. by means of a Henschel mixer and then were kneaded in a pressure kneader for 60 minutes while maintaining the bath temperature at 145° C. and the material temperature at 160° C. to obtain a composition.

The composition was pelletized to a pellet of 2.0×2.0 mm using a pelletizer and extruded through a die of 0.75 mm in diameter with the diehead temperature of 130° C. by means of a conventional single screw extruder to obtain an organic linear material.

The linear material was wound on a round carbon rod of 10.0 mm in diameter and fixed the both ends.

Then the resulting shape was heat treated at 180° C. in the presence of air in an oven for 24 hours to obtain an insoluble and infusible material.

Subsequently, it was calcined in the same manner as in Example 5 to obtain the desired carbonaceous spring.

The carbonaceous spring was 0.5 mm in line diameter, 10.0 mm in coil diameter and 100 mm in coil length, and 5500 kg/cm$^2$ in carbonaceous linear material strength and 85% in carbonization yield.

EXAMPLE 7

100%, by weight, of chlorinated vinyl chloride resin of 800 in average degree of polymerization and 64.6% in chlorine content were homogeneously dispersed with 50%, by weight, of chopped fiber of carbonaceous fiber calcined at 1000° C., of 12.5 μm in single yarn diameter and 3.0 mm in fiber length and 20%, by weight, of D.O.P., and, after the plasticizer soaked sufficiently through the resin, were kneaded with adding sufficient shear force in a pressure kneader for 60 minutes while maintaining the bath temperature at 140° C. and the material temperature at 160° C.

Thereafter it was pelletized to a pellet of 2.0×2.0 mm by a pelletizer and was extruded through a die of 1.0 mm in diameter with the diehead temperature of 130° C. by means of a conventional single screw extruder to obtain a composite reinforced organic linear material.

The linear material was wound on a round carbon rod of 10.0 mm in diameter applying tension and fixed the both ends, and subsequently was treated in the presence of air in an oven heated to 180° C. to make it insoluble and infusible, and then was calcined in an atmosphere of nitrogen in the same condition as in Example 5 to obtain the desired carbonaceous spring.

The carbonaceous spring obtained was 0.75 mm in line diameter, 10.0 mm in coil diameter and 150 mm in spring length, and the carbon content was 99.0%.

EXAMPLE 8

25%, by weight, of polyvinyl alcohol of 2000 in average degree of polymerization, 15%, by weight, of tragacanth gum and 10%, by weight, of vanillin were added with 50%, by weight, of flake graphite from Madagascar (leaf-like grind of 2.0 μm in average particle size and 4 in aspect ratio), and, after homogeneously dispersed by means of a Henschel mixer, 20%, by weight, of ethylene glycol as a plasticizer were added thereto and further an appropriate amount of water was added as a solvent. Subsequently, after sufficiently kneaded by a pressure kneader and further kneaded by a twin roll to adjust the amount of solvent so as be fit for extrusion (15 to 17%, by weight), the kneadered mixture was deaerated and preformed by a vacuum preforming machine and then was extruded through a die of 0.78 mm in diameter with the diehead temperature of 120° C. by a plunger hydraulic extruder to obtain a composite reinforced organic linear material. The linear material was wound on a carbon rod of 10.0 mm in diameter applying tension and fixed the both ends.

Then, the resulting shape was heated at 120° C. for 10 hours in the presence of air to remove the water content and thereafter heat treated at 180° C. for 20 hours to make it insoluble and infusible.

The precursor shape so obtained was calcined at 1000° C. in the same manner as in Example 5 to obtain the desired carbonaceous spring. The carbonaceous spring obtained was 0.55 mm in line diameter, 10.0 mm in coil diameter and 100 mm in spring length, and the carbon content was 98.5% and the carbonaceous linear material strength was 8000 kg/cm$^2$.

EXAMPLE 9

The carbonaceous spring obtained in Example 1, as it is without releasing from the carbonaceous support, was heated to 1000° C. at a heating rate of 300° C. per hour in an atmosphere of argon gas and to 2800° C. at a heating rate of 400° C. per hour, and after maintained at 2800° C. for 60 minutes, was allowed to cool to obtain a graphite spring.

The graphite spring obtained was 1000 kg/mm$^2$ in elastic modulus in the direction of spring line and 100 kg/mm$^2$ in elastic modulus in the direction perpendicular to the direction of spring line so that it was very high in anisotropic property.

What is claimed is:

1. A carbon spring prepared by a process, comprising:

shaping an organic linear material, the organic constituent of which is selected from the group consisting of a thermoplastic resin, a thermosetting resin, a pitch, a natural high molecular weight substance, a synthetic high molecular weight substance containing a condensed polycyclic aromatic base structure which is high in carbon yield and mixtures thereof, into the form of a coiled spring; and then carbonizing the spring shaped organic linear material.

2. The carbon spring of claim 1, wherein said pitch is petroleum asphalt, coal tar pitch, cracked naphtha pitch or a carbonized material of a hydrocarbon compound of petroleum asphalt, coal tar pitch or a synthetic resin.

3. The carbon spring of claim 1, wherein said natural organic high molecular weight substance is lignin, cellulose, tragacanth gum, gum arabi, natural rubber or humic acid and derivatives thereof.

4. The carbon spring of claim 1, wherein said synthetic high molecular weight substance is a formalin condensate of naphthalene sulfonic acid, dinitronaphthalene or indanthrene vat dyes derived from pyrene, pyranthrone, violanthrone, benzanthrone or intermediates thereof.

5. The carbon spring of claim 1, wherein said thermoplastic resin is polyvinyl chloride, polyacrylonitrile, polyvinylidene chloride, polyvinyl acetate, polyvinyl alcohol, polyvinyl pyrrolidone, ethyl cellulose, polyvinyl chloride-vinyl acetate copolymer, polyacrylonitrile-styrene copolymer, polyacrylonitrile-vinyl chloride copolymer, polyamide, carboxymethylcellulose, polyphenylene oxide, polyparaxylene, polysulfone, polyimide, polyamideimide, polyester imide, polybenzimidazole or polyoxadiazole.

6. The carbon spring of claim 1, wherein said thermosetting resin is a phenol resin, an epoxy resin, a xylene resin, an alkyd resin or an unsaturated polyester resin.

7. The carbon spring of claim 1, wherein said organic linear material is further composed of carbon fibers, graphite whiskers, or crystalline graphite powder as a reinforcing material.

8. The carbon spring of claim 7, wherein said reinforcing material comprises 20 to 80% by weight of the organic linear material.

9. A process for fabricating a coiled carbon spring, which comprises:

shaping an organic linear material, the organic constituent of which is selected from the group consisting of a thermoplastic resin, a thermosetting resin, a pitch, a natural high molecular weight substance, a synthetic high molecular weight substance containing a condensed polycyclic aromatic base structure which is high in carbon yield and mixtures thereof, into the form of a coiled spring; and then carbonizing the spring shaped organic linear material.

10. The process of claim 9, wherein said carbonization step comprises heating said shaped organic linear material to a temperature of 500° to 1500° C. in an inert atmosphere.

11. The process of claim 10, wherein said carbonized organic linear material is further heated to a temperature of 2000° to 3000° C. in an inert atmosphere to further complete the carbonization process.

12. The process of claim 9, wherein after shaping said organic linear material into the shape of a coiled spring, the organic linear material is heated to a temperature of 50° to 300° C. in an active or inert atmosphere prior to carbonization.

13. The process of claim 9, wherein said organic linear material is cured by a crosslinking reaction after said organic linear material is shaped, but before carbonization of said organic linear material.

* * * * *